United States Patent [19]

Gurak et al.

[11] 4,302,377

[45] Nov. 24, 1981

[54] LATEX COAGULATION

[75] Inventors: Nur Gurak; Klaas Tebbens, both of Sarnia, Canada

[73] Assignee: Polysar Limited, Sarnia, Canada

[21] Appl. No.: 100,278

[22] Filed: Dec. 5, 1979

[30] Foreign Application Priority Data

Jul. 19, 1979 [CA] Canada ................................. 332148

[51] Int. Cl.$^3$ ............................................. C08J 3/16
[52] U.S. Cl. .............................. 260/29.7 PT; 525/1; 525/3; 525/4; 526/310; 526/335; 526/338; 526/340; 526/342; 528/490; 528/501; 528/502; 260/821
[58] Field of Search ..................... 260/29.7 PT, 821; 526/310, 335, 338, 340, 342; 525/1, 3, 4; 528/490, 501, 502

[56] References Cited

U.S. PATENT DOCUMENTS 2,366,460  1/1945  Semon .............................. 260/861

FOREIGN PATENT DOCUMENTS 686381  5/1964  Canada .

OTHER PUBLICATIONS

Chemical Abstracts, vol. 86, (1977), 91474x.
Synthetic Rubber, Whitby, (1954), pp. 948-949.

*Primary Examiner*—Harold D. Anderson
*Attorney, Agent, or Firm*—Stevens, Davis, Miller & Mosher

[57] ABSTRACT

There is provided a process and apparatus for the coagulation of an aqueous latex of a polymer wherein the latex and an aqueous coagulant are mixed in a tubular coagulation means and the essentially completely coagulated mixture therefrom is passed into one or two vessels containing aqueous coagulant followed by separation, recovery and drying of the coagulated polymer.

8 Claims, 5 Drawing Figures

LATEX COAGULATION

This invention relates to an improved process for the coagulation of an aqueous latex of a polymer to produce particles of polymer which may be subjected to recovery and drying in a conventional manner.

The existence of polymers in the form of an aqueous latex is very well known in the art. Such a latex may be produced by the aqueous free radical emulsion polymerization of suitable monomers. Although many applications exist in which the latex, per se, is used, the major proportion of rubbery polymers produced as latices by aqueous free radical emulsion polymerization are required as dry polymer which necessitates recovery of the polymer from the aqueous latex. Conventionally, polymers are recovered from the aqueous latex by contacting and mixing with a suitable coagulant which causes the polymer to coagulate from the aqueous phase and the coagulated polymer is separated and recovered from the aqueous phase and dried. Coagulation is normally practised by feeding the latex, which may or may not have already been mixed with an agent to cause creaming, into a large tank already containing a coagulant or simultaneously feeding coagulant into the tank and mixing thoroughly the contents of the tank. Such processes are described in the book by Whitby at pages 201 to 204 for the styrene-butadiene rubbers, at page 803 for the butadiene-acrylonitrile rubbers and at pages 948–949 for German developments (Synthetic Rubber, G. S. Whitby, Editor, J. Wiley & Sons Inc.) German Pat. No. 761,636 describes a process for precipitating polymer from an aqueous emulsion or latex thereof by mixing the latex and a coagulant, immediately removing the precipitated particles and subsequently mixing the precipitated particles with water, the precipitation being achieved in a vertical tower equipped with agitators. Canadian Pat. No. 686,381 describes a process for the production of a strand of coagulated rubber by mixing a latex and an electrolyte solution in a nozzle and passing the mixture into a flow pipe under conditions of laminar flow.

We have now discovered an improved process and an apparatus for the coagulation of an aqueous latex of a polymer by contact with an aqueous solution of an inorganic coagulant wherein said latex and said coagulant are mixed in a tubular coagulation means causing essentially complete coagulation therein, said essentially completely coagulated mixture then being passed into one or more vessels containing an aqueous phase and being equipped with agitators for the contents thereof, followed by separation, recovery and drying of the coagulated polymer.

In accordance with our invention, there is provided an improved process for the coagulation of an aqueous latex of a polymer which comprises contacting a stream of said latex with an aqueous stream of an inorganic coagulant and separating, recovering and drying a coagulated polymer therefrom wherein said polymer comprises a rubbery $C_4$–$C_6$ conjugated diolefin containing polymer, the improvement being that said latex and said coagulant are mixed in a tubular coagulation means of narrow diameter elongate form at a temperature of from about 50° to about 80° C. for a time of from about 0.1 to about 25 seconds and under conditions of flow described by a Reynolds Number of from about 7500 to about 75000, and the essentially completely coagulated mixture from said tubular coagulation means is passed into the first of a series of two interconnected vessels or into a single vessel, said vessels being equipped with agitators to mix the contents thereof and containing aqueous coagulant, said tubular coagulation means terminating below the level of the aqueous coagulant in the first said vessel, the average residence time in said vessel or vessels being a total of from about 1 minute to about 15 minutes, the coagulated polymer from said vessel or vessels then being separated from the aqueous phase and recovered and dried.

Also in accordance with our invention, there is provided apparatus for the coagulation of a rubbery $C_4$–$C_6$ conjugated diolefin containing polymer from an aqueous latex thereof by mixing with an aqueous inorganic coagulant, which apparatus comprises pump means for providing a liquid stream of latex, pump means for providing a liquid stream of coagulant, a tubular coagulation means fed by said two pump means, said latex stream entering said tubular coagulation means at a point downstream of the point of entry of the coagulant stream, said tubular coagulation means being of narrow diameter elongate form such as to provide for the liquids flowing therethrough a residence time of from about 0.1 to about 25 seconds and a Reynolds Number of from about 7500 to about 75,000, one or a series of two interconnected vessels containing aqueous coagulant and equipped with agitators for the contents thereof and an overflow line attached to the vertical wall of the vessel, said tubular coagulation means terminating below the level of the aqueous coagulant in the first said vessel, said vessel or vessels being sized as to provide a residence time therein of from about 1 to about 15 minutes, mechanical separating means supplied by said overflow line from said vessel to separate the coagulated polymer from the aqueous phase, means for recovering said coagulated polymer, means for drying said recovered coagulated polymer, means for recovering the separated aqueous phase, means for supplying heat to said separated aqueous phase to provide thereto a temperature of from about 50° to about 80° C., means to supply fresh coagulant to said separated aqueous phase, and means to supply said separated aqueous phase to said pump means for providing a liquid stream of coagulant.

The latices which may be coagulated in the present process comprise rubbery $C_4$–$C_6$ conjugated diolefin containing polymers. Such latices are well known in the art. Rubbery $C_4$–$C_6$ conjugated diolefin containing polymers include polybutadiene, butadiene-styrene or butadiene-alphamethylstyrene copolymers containing from about 40 to about 85 weight percent of butadiene, butadiene-acrylonitrile or isoprene-acrylonitrile copolymers containing from about 50 to about 80 weight percent of butadiene or isoprene ad butadiene-styrene or butadiene-acrylonitrile copolymers containing small amounts up to about 5 weight percent of one or more additional monomers such as divinyl benzene, glycidyl or hydroxyethyl acrylate or methacrylate, amine substituted acrylates or methacrylates such as dimethylaminoethyl methacrylate, acrylamide, mono- or difunctional unsaturated carboxylic acids and the like. Such polymers are prepared by the well known aqueous free radical emulsion polymerization processes in which the emulsifiers are selected from one or more of the fatty acids, the rosin acids and the synthetic emulsifiers such as the naphthalene sulphonic acids and the like. The polymer content of such latices is generally from about 10 to about 35 weight percent, preferably from about 20 to about 30 weight percent.

Coagulants used in the present invention are also well known in the art and comprise aqueous solutions of the inorganic acids such as sulphuric and hydrochloric acid and aqueous solutions of inorganic electrolytes such as the alkali metal halides, the alkaline earth metal halides and sulphates and alum. Preferred coagulants are sulphuric acid or sulphuric acid sodium chloride mixtures especially for butadiene-styrene polymers and calcium chloride for butadiene-acrylonitrile polymers. Concentrations in water of such coagulants are well known in the art, for example sulphuric acid being used at a convenient concentration to maintain the pH at the desired level, sodium chloride as a 3 to 8 percent solution and calcium chloride being used as a 0.3 to 1 percent solution. Additional coagulation aids may be used as desired—such coagulation aids may include polyamine compounds, animal glue, casein, lignin and the like.

The latex and the coagulant are mixed in a tubular coagulation means at a temperature of from about 50° to about 80° C. A preferred temperature range is from about 60° to about 70° C. The residence time in said tubular coagulation means is from about 0.1 to about 25 seconds and the conditions of flow are described by a Reynolds Number of from about 7500 to about 75,000, that is to say, the flow is turbulent. Generally, if a low residence time is used, such as from about 0.1 to about 5 seconds, the Reynolds Number is desirably high, such as from about 20,000 to about 75,000. A preferred such embodiment is a residence time in the tubular coagulation means of from about 0.3 to about 3 seconds and a Reynolds Number of from about 25,000 to about 60,000. If a long residence time is used, such as from about 5 to about 25 seconds, the Reynolds Number may be low, such as from about 7500 to about 20,000. A preferred such embodiment is a residence time of from about 5 to about 20 seconds and a Reynolds Number of from about 10,000 to about 20,000.

The tubular coagulation means is of narrow diameter elongate form. The latex stream enters the tubular coagulation means from a line at a point downstream of the point of entry of the coagulant stream. It is desirable to achieve rapid mixing of the latex with a large volume of coagulant in order to cause the formation of discrete particles of polymer and therefore the latex stream is fed into the stream of coagulant flowing within the tubular coagulation means. The volume flow rate of the latex stream is significantly less than the volume flow rate of the coagulant stream (as hereinafter described) and this further facilitates the rapid mixing of the latex stream with the coagulant. The tubular coagulation means is essentially a long narrow diameter pipe having at the one end lines for supply of coagulant and latex and being open at the other end. The open end is immersed below the liquid layer of the vessel which the coagulation means supplies. Preferably the tubular coagulation means is maintained essentially full. The coagulant and latex lines are sized accordingly, with the latex line optionally providing one or a number of entry points for the latex into the coagulant stream. The line for supply of the latex is attached to and supplies the tubular coagulation means at a point downstream of the point where the coagulant enters the tubular coagulation means. The actual diameter and length of the tubular coagulation means may be readily calculated knowing the volume flow rate desired and knowing that the residence time is to be within the range of from about 0.1 to about 25 seconds and knowing further that the Reynolds Number is to be within the range of from about 7500 to about 75,000. The Reynolds Number is calculated from the equation $$\text{Reynolds Number} = \frac{D v \rho}{\mu}$$

where D is pipe diameter in cms, v is the flow velocity in cm/sec., $\rho$ is the density in g/cm$^3$ and $\mu$ is the viscosity in g/cm. sec.

The essentially completely coagulated mixture from the tubular coagulation means is passed into the first of a series of two interconnected vessels or into a single vessel. These vessels are conventional tanks equipped with an agitator to provide mixing of the contents therein and contain aqueous coagulant. The tubular coagulation means terminates below the level of the aqueous coagulant in the first said vessel. Preferably a single vessel is used. The vessel or vessels are equipped with an overflow line attached to the vertical wall of the vessel. The vessel or vessels are sized so as to provide a residence time therein of from about 1 to about 15 minutes. The purpose of such vessel or vessels is to ensure complete coagulation of the latex such that the aqueous phase is essentially clear and has essentially no cloudy appearance due to suspended material present and appear to influence the size of the polymer particles apparently in relationship to the agitation in the vessel—when the agitation rate is increased the particle size is decreased. When two vessels in series are used, the material flows by overflow from the first to the second vessel. The overflow from either the single vessel or the second of the two vessels in series is passed to a mechanical separating means of the type well known in the art, for example, a vibrating screen or a continuous moving screen belt, for the separation of the coagulated polymer from the bulk of the aqueous phase. The separated aqueous phase is preferably recycled for reuse as coagulant and heat and fresh coagulant are supplied as necessary to maintain the desired temperature and concentration. The separated coagulated polymer is subjected, optionally to a water washing stage, and then to a drying operation for the recovery of dry polymer suitable for packaging. Such drying operations are well known in the art and include squeezing and drying in a tunnel drier or extruder dewatering and extruder drying.

Preferably, the ratio of coagulant to latex flow rates falls within a certain range. The latex may contain, as hereinbefore stated, from about 10 to about 35 weight percent of polymer—accordingly the above ratio is defined in terms of the polymer content of the latex. Preferably, the ratio of the flow, expressed as weight per unit time, of aqueous coagulant solution to the flow of the latex, expressed as weight of polymer per unit time, is from about 40:1 to about 250:1, preferably from about 50:1 to about 120:1. The higher ratio of coagulant flow would normally only be used when the coagulant concentration was very low.

In order to better understand the process and apparatus of the invention, reference is made to the FIGS. which describe specific embodiments of apparatus according to the invention.

Figure 1:
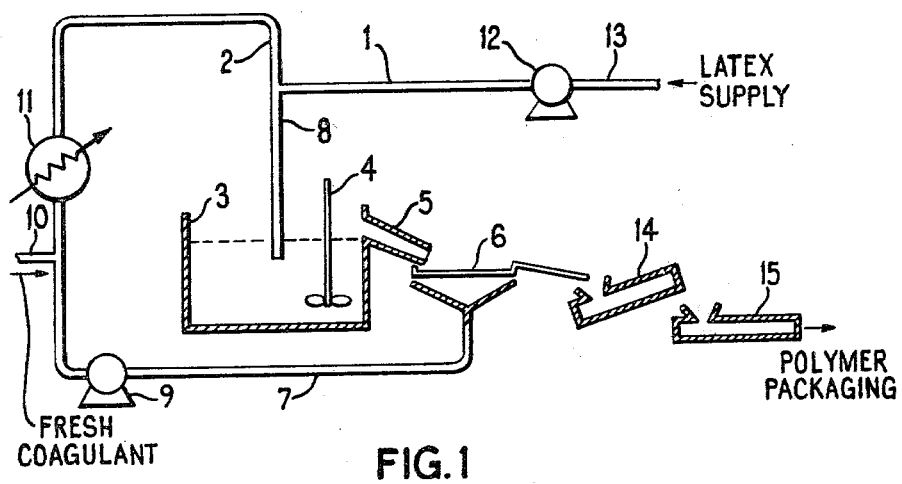
FIG. 1 is a schematic outline of a process according to the invention using apparatus of the invention in which the tubular coagulation means feeds to a single vessel.

With reference to FIG. 1, latex is fed by line 1 and coagulant by line 2 to a tubular coagulation means 8. Latex from the latex supply passes by line 13 to pump 12 and thence into line 1. Vessel 3 is filled with coagulant to the level of overflow line 5 and is equipped with an agitator 4. The tubular coagulation means 8 feeds into the aqueous contents of vessel 3 such that the exit from the tubular means is below the liquid level in the vessel and supplies the essentially completely coagulated mixture to the coagulant in the vessel. The overflow from vessel 3, which is coagulated polymer and the aqueous phase, passes by overflow line 5 to a mechanical separating means 6, such as a vibrating screen. The aqueous phase separated by the separator is collected and passes by line 7 for recycle by pump 9, with fresh coagulant, as necessary, supplied by line 10, through heat exchanger 11 to line 2. The polymer separated on the separating means is conveyed to suitable drying means shown in the Figure as a dewatering extruder 14 and an extruder drier 15 and is then packaged—optionally the polymer may be subjected to a washing step before drying and packaging.

Figure 2:
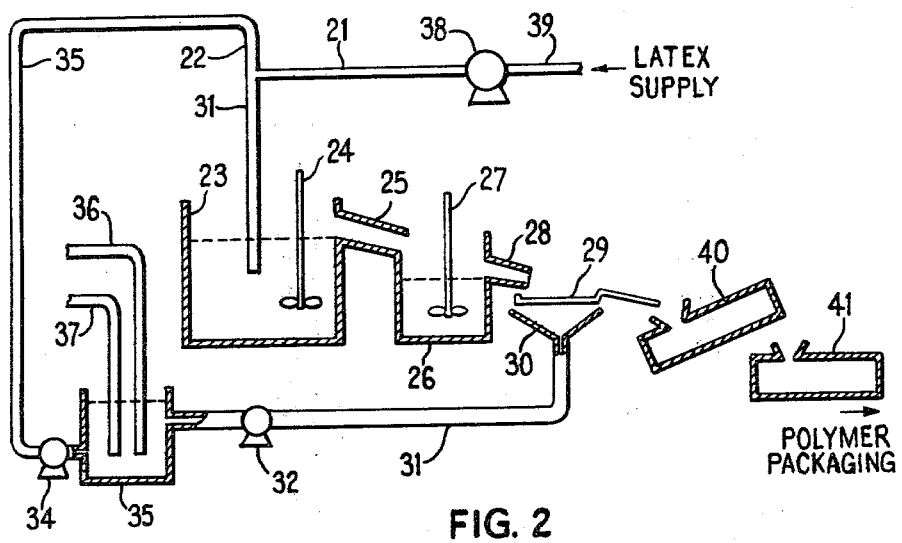
FIG. 2 is a schematic outline of a process according to the invention using apparatus of the invention in which the tubular coagulation means feeds to the first of two vessels in series.

In reference to FIG. 2, latex is fed by line 21 to the tubular coagulation means 31 and coagulant is fed by line 22 to the tubular coagulation means 31. Latex from the latex supply is fed through line 39 to pump 38 which supplies it to line 21. Coagulant from tank 33 is provided by pump 34 to line 35 which feeds the coagulant to line 22. The tubular coagulation means feeds into the aqueous coagulant contained in vessel 23 which is equipped with agitator 24. The overflow from vessel 23 passes by overflow line 25 to vessel 26, vessel 26 also containing aqueous coagulant and being equipped with agitator 27. Overflow from vessel 26 is fed to a mechanical separating means 29 and the separated polymer is passed from the separating means, optionally through a washing step, to suitable drying means such as a dewatering extruder 40 and an extruder drier 41 and to suitable packaging means. The aqueous phase separated by the separating means is collected at 30 and passed by line 31 to a recycle system for reuse as coagulant. Line 31 feeds the aqueous phase to pump 32 which transfers it to tank 33. Line 36 supplies fresh coagulant, as necessary, to tank 33 and the temperature of the aqueous phase in tank 33 is maintained at the desired level by the controlled addition of stream through line 37.

Figure 3:
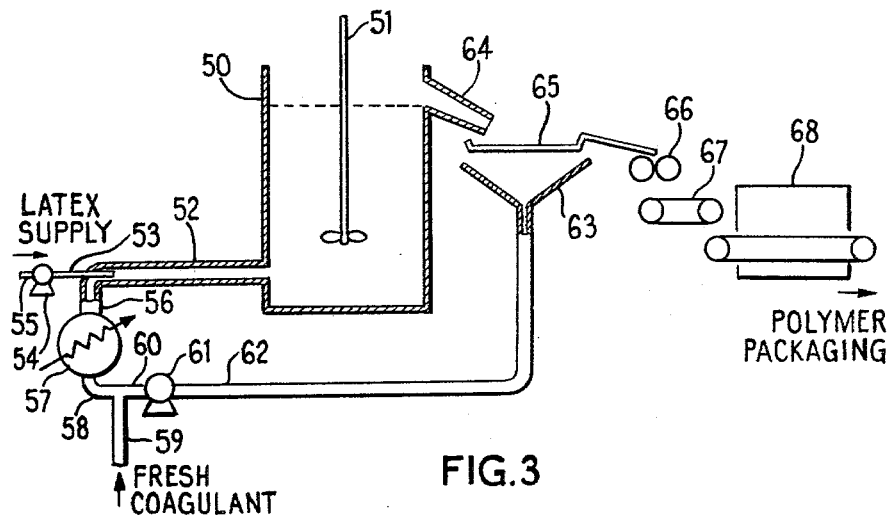
FIG. 3 is a schematic outline of further apparatus suitable for practicing the process of the invention.

FIG. 3 shows a schematic outline of further apparatus suitable for practicing the process of the invention. Vessel 50, equipped with agitator 51, contains aqueous coagulant up to the level of overflow line 64. Latex from the latex supply is supplied by line 55 to pump 54 to line 53. The tubular coagulation means 52 receives its supply of coagulant from line 56, the latex is supplied by line 53 which terminates within the tubular coagulation means and the tubular coagulation means 52 terminates at the wall of vessel 50 such that the essentially completely coagulated mixture is fed into the aqueous coagulant in vessel 50. The coagulated polymer and the aqueous phase flow by overflow line 64 to a mechanical separating means 65 and the separated polymer is passed to squeezing rollers 66 onto conveyor 67 and thence to a hot air tunnel drier 68. Dry polymer from the drier is then transferred to packaging facilities. The aqueous phase separated from the polymer on the mechanical separating means 65 is collected at 63 and passed by line 62 to pump 61 into line 60. Fresh coagulant, as necessary, is added by line 59. The aqueous coagulant flows by line 58 to heat exchanger 57 wherein the temperature is controlled to the desired level and thence by line 56 to the tubular coagulation means.

Figure 4:
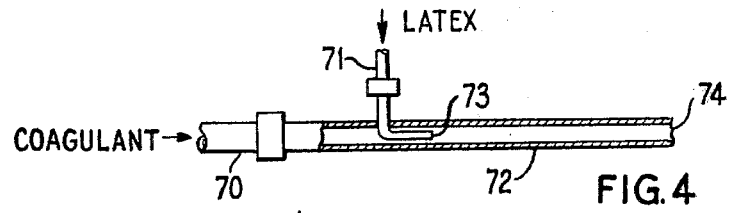
FIG. 4 is a schematic outline of tubular coagulation means for use in the apparatus and process of the invention.

In FIG. 4 there is shown a tubular coagulation means. Latex enters by line 71 which is connected to line 73 for the entry of the latex into the tubular coagulation means 72. Coagulant enters by line 70. The latex and the coagulant streams are mixed in tubular coagulation means 72. The latex line 73 of the tubular coagulation means terminates at a point just beyond where the coagulant enters the coagulation means in order to provide optimal mixing of the streams. Line 73 may terminate as an open ended pipe, may be equipped with a suitable dispersing type nozzle or may be equipped with a suitable distributor. The end 74 of the tubular coagulation means is immersed in the aqueous phase contained in the vessel which it is supplying.

Figure 5:
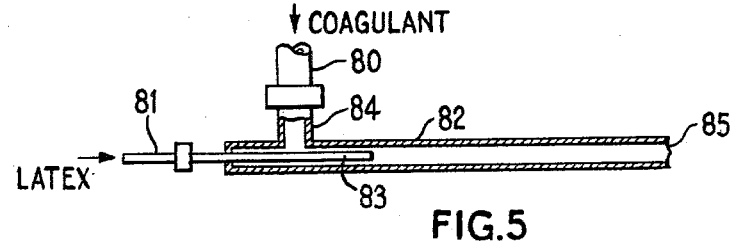
FIG. 5 is a schematic outline of a further tubular coagulation means for use in the apparatus and process of the invention.

FIG. 5 shows a further tubular coagulation means. Latex enters by line 81 and coagulant enters by line 80. The latex enters the tubular coagulation means 82 through line 83 which terminates at a point just downstream of the point at which the coagulant enters at line 84. End 85 of the tubular coagulation means is immersed in the aqueous phase contained in the vessel which it is supplying.

The tubular coagulation means is preferably a circular diameter pipe sized according to the total flow rate and residence time desired. For instance, for a pilot plant scale of operation the latex line may be of from about 0.3 to about 1.5 cm diameter pipe, the coagulant line may be of from about 1 to about 3 cm pipe and the tubular coagulation means may be from about 1 to about 3 cm diameter pipe, the diameter of the coagulant line preferably being not significantly less than the diameter of the tubular coagulation means. Commercial scale facilities would similarly be sized accordingly. The length of the tubular coagulation means would be chosen to provide the required residence time. Preferably, the tubular coagulation means is maintained full of fluid during operation.

In the operation of processes as shown in FIGS. 1, 2 and 3 it is preferable to maintain the temperature in the tubular coagulation means by providing heat to the coagulant stream, which can be achieved in a continuous operation by supplying the necessary heat by heat exchange or by direct addition of steam to the recycle coagulant stream and in a batch operation by heating the coagulant stream before it is fed to the tubular coagulation means.

Polymers produced in the process of the present invention were found to have chemical and vulcanizable characteristics similar to those for polymers recovered by a conventional process. The polymers may be used as is well known in the art, such as in tire production for SBR and in seals for NBR.

The following examples illustrate the invention. Other variations will be obvious to one of average skill in the art. All parts are parts by weight and flow rates are kg/min.

EXAMPLE 1

The equipment used was that shown in FIG. 1 with a tubular means as shown in FIG. 4 except that the polymer recovered from the mechanical separating means 6 was dried in a pilot plant scale hot air circulating oven. For the tubular coagulation means, line 71 supplying the latex was 0.6 cm pipe and line 70 supplying the coagulant was 2.5 cm pipe. The tubular means 72 was about 7.6 m of 3.5 cm pipe. With reference to FIG. 1, the tank 3 had a diameter of about 60 cm with the overflow 5 being about 60 cm above the base. The tubular coagulation means 8 terminated about 15 cm below the liquid surface of tank 3. The agitator 4 was a 3-blade marine propeller rotated at about 680 rpm. The coagulant was heated to a temperature of 63° C. The mechanical separator 6 was a Sweeco vibrating screen. The separated polymer was dried in an air circulating drier at a temperature of about 60° C. for 10 to 14 hours. The coagulant was a solution of 0.5 weight percent concentration of calcium chloride in water. The latex contained 23 weight percent of a butadiene-acrylonitrile polymer having about 34 weight percent of bound acrylonitrile and a molecular weight measured as the Mooney (ML1+4 at 100° C.) of about 50. When the process was operated under stable conditions, the latex flow rate was 1.35 kg/min. and the coagulant flow rate was 33 kg/min. giving a ratio of coagulant to latex flow rates of about 106:1 expressed as the ratio of the weight of coagulant solution per minute to the weight of polymer per minute. The residence time in the tubular coagulation means was 17 seconds and the residence time in the vessel tank 3 was about 6.5 minutes. The Reynolds Number calculated for the tubular coagulation means was 17,800. The polymer was obtained as discrete particles of about 0.6 cm diameter and fairly uniform size distribution. The aqueous phase separated by the mechanical separator 6 and collected in line 7 was clear with no signs of fine suspended material.

EXAMPLE 2

The equipment used was as shown in FIG. 2 with a tubular coagulation means as shown in FIG. 5, with the exception that the polymer recovered from the mechanical separating means was dried in a pilot plant scale hot air circulating oven. With reference to FIG. 5, line 81 for supply of the latex was about 0.6 cm diameter and line 80 for supply of the coagulant was about 2.5 cm diameter. The tubular coagulation means 82 was of about 2.5 cm diameter pipe and was about 1.2 m long. Line 83 terminated about 2.5 cm beyond the point at which coagulant entered by line 84. In reference to FIG. 2, the tubular coagulation means 31 terminated about 15 cms below the surface of the liquid in vessel 23 which was of about 45 cm diameter with the overflow 25 being about 30 cm above the base. The agitator 24 was a three-blade marine propeller mixer operated at 2200 rpm. Vessel 26 was of about 60 cm diameter with the overflow 28 being about 60 cm above the base. The agitator 27 was a 3-blade marine propeller operated at 680 rpm. The temperature of the coagulant supplied by line 22 was 60° C. The coagulant was a 0.43 weight percent solution of calcium chloride in water. The latex used was the same as that of Example 1. When stable operations were achieved, the latex flow rate in line 21 was 1.8 kg/min. and the coagulant flow rate in line 22 was 52 kg/min. The ratio of coagulant to latex flow rates was about 120:1 expressed as the ratio of the weight of coagulant solution per minute to the weight of the polymer in the latex per minute. The residence time in the tubular coagulation means was 0.8 seconds, in vessel 23 was 65 seconds and in vessel 26 was 3.5 minutes. The Reynolds Number calculated for the tubular coagulation means was 42,000. The polymer recovered on the mechanical separator 29 was of uniform size distribution and had an average diameter of about 0.5 to 0.6 cm. The separated aqueous phase collected at 30 was clear with no signs of fine material present.

EXAMPLE 3

The apparatus of Example 2 was used. The latex was as in Example 2 and the coagulant was a 0.39 weight percent solution in water of calcium chloride. The temperature of the coagulant was 63° C. and the temperature in vessel 23 was maintained at 71° C. by the addition of steam. The agitator in vessel 23 was operated at 2340 rpm and the agitator in vessel 26 was operated at 680 rpm. At stable conditions of operation, the latex flow rate in line 21 was 1.4 kg/min. and the coagulant flow rate in line 22 was 43 kg/min, giving a ratio of coagulant to latex flow rates of about 134:1 expressed as the ratio of the weight of coagulant solution per minute to the weight of polymer per minute. The residence time in the tubular coagulation means was 0.9 seconds, in vessel 23 was 1.25 minutes and in vessel 26 was 4.3 minutes. The Reynolds Number calculated for the fluids in the tubular coagulation means was about 36,000. The product was of uniform particle size and the recovered aqueous phase was clear.

EXAMPLE 4

The apparatus and latex of Example 2 was used. The coagulant was a 0.66 weight percent solution of calcium chloride in water. The temperature of the coagulant was 71° C. and the temperature in vessel 23 was maintained at 75° C. by the addition of steam. The agitator in vessel 23 was operated at 2350 rpm and the agitator in vessel 26 was operated at 680 rpm. At steady operating conditions, the flow rate of latex in line 21 was 1.8 kg/min and the flow rate of coagulant in line 22 was 33 kg/min.—the ratio of coagulant to latex flow rates was about 79:1 expressed as before. The residence time in the tubular coagulation means was 1.2 seconds, in vessel 23 was 1.6 minutes and in vessel 26 was 5.5 minutes. The Reynolds Number calculated for the tubular coagulation means was about 27,200. The polymer was obtained as particles of about 0.5 to 0.7 cm diameter and the recovered aqueous phase was clear.

EXAMPLE 5

The apparatus of Example 2 was used except that the tubular coagulation means was 4.8 m of 2.5 cm diameter pipe. The latex was also as used in Example 2 and the coagulant was calcium chloride at a concentration of 0.5 weight percent. The temperature of the coagulant was 68° C. and no further heat was added to vessel 23. The agitator in vessel 23 was operated at 2200 rpm and that in vessel 26 at 680 rpm. When steady operations were established, the flow rate of latex in line 21 was 4.0 kg/min. and the flow rate of coagulant solution in line 22 was about 166 kg/min. The ratio of coagulant to latex was thus about 180:1, calculated as before. The residence time in the tubular coagulation means was about 2.7 seconds, the residence time in vessel 23 was about 40 seconds and the residence time in vessel 26 was about 2.5 minutes. The Reynolds Number was calculated to be about 60,000 for the tubular coagulation means. Good quality product was obtained and the separated aqueous phase contained no fine material.

Samples of the polymers produced in Examples 1 to 5 were found to have chemical compositions and vulcanizate properties typical of polymers recovered by a conventional process.

What is claimed is:

1. An improved process for the coagulation of an aqueous latex of a polymer which comprises contacting a stream of said latex with an aqueous stream of an inorganic coagulant and separating, recovering and drying a coagulated polymer therefrom wherein said polymer comprises a rubbery $C_4$–$C_6$ conjugated diolefin-containing polymer, the improvement being that said latex and said coagulant are mixed in a tubular coagulation means of narrow diameter elongate form at a temperature of from about 50° to about 80° C. for a time of from about 0.1 to about 25 seconds and under conditions of flow described by a Reynolds Number of from about 7,500 to about 75,000, the ratio of the weight per unit of time of flow of aqueous coagulant to the weight per unit of time of flow of polymer in the latex being from about 40:1 to about 250:1, and the essentially completely coagulated mixture from said tubular coagulation means is passed into the first of a series of two interconnected vessels or into a single vessel, said vessels being equipped with agitators to mix the contents thereof and containing aqueous coagulant, said tubular coagulation means terminating below the level of the aqueous coagulant in the first said vessel, the average residence time in said vessel or vessels being a total of from about 1 to about 15 minutes, the coagulated polymer from said vessel or vessels then being separated from the aqueous phase and recovered and dried.

2. The process of claim 1 wherein the latex stream enters the tubular coagulation means at a point downstream of the point of entry of the coagulant stream.

3. The process of claim 2 wherein the latex contains from about 10 to about 35 weight percent of polymer and said polymer is polybutadiene, butadiene-styrene or butadiene-alphamethylstyrene polymer containing from about 40 to about 85 weight percent of butadiene, butadiene-acrylonitrile or isoprene-acrylonitrile polymer containing from about 50 to about 80 weight percent of butadiene or isoprene or butadiene-styrene or butadiene-acrylonitrile polymer containing up to about 5 weight percent of one or more additional monomers.

4. The process of claim 2 wherein the coagulant is an aqueous solution of sulphuric or hydrochloric acid, alkali metal halides, alkaline earth metal halides or sulphates, or alum.

5. The process of claim 4 wherein the coagulant is selected from sulphuric acid or sulphuric acid-sodium chloride mixtures and the polymer is a butadiene-styrene polymer.

6. The process of claim 4 wherein the coagulant is calcium chloride and the polymer is a butadiene-acrylonitrile polymer.

7. The process of claim 2 wherein the residence time in said tubular coagulation means is from about 0.1 to about 5 seconds and the Reynolds Number is from about 20,000 to about 75,000.

8. The process of claim 2 wherein the residence time in said tubular coagulation means is from about 5 to about 25 seconds and the Reynolds Number is from about 7,500 to about 20,000.

* * * * *